United States Patent Office 2,732,423
Patented Jan. 24, 1956

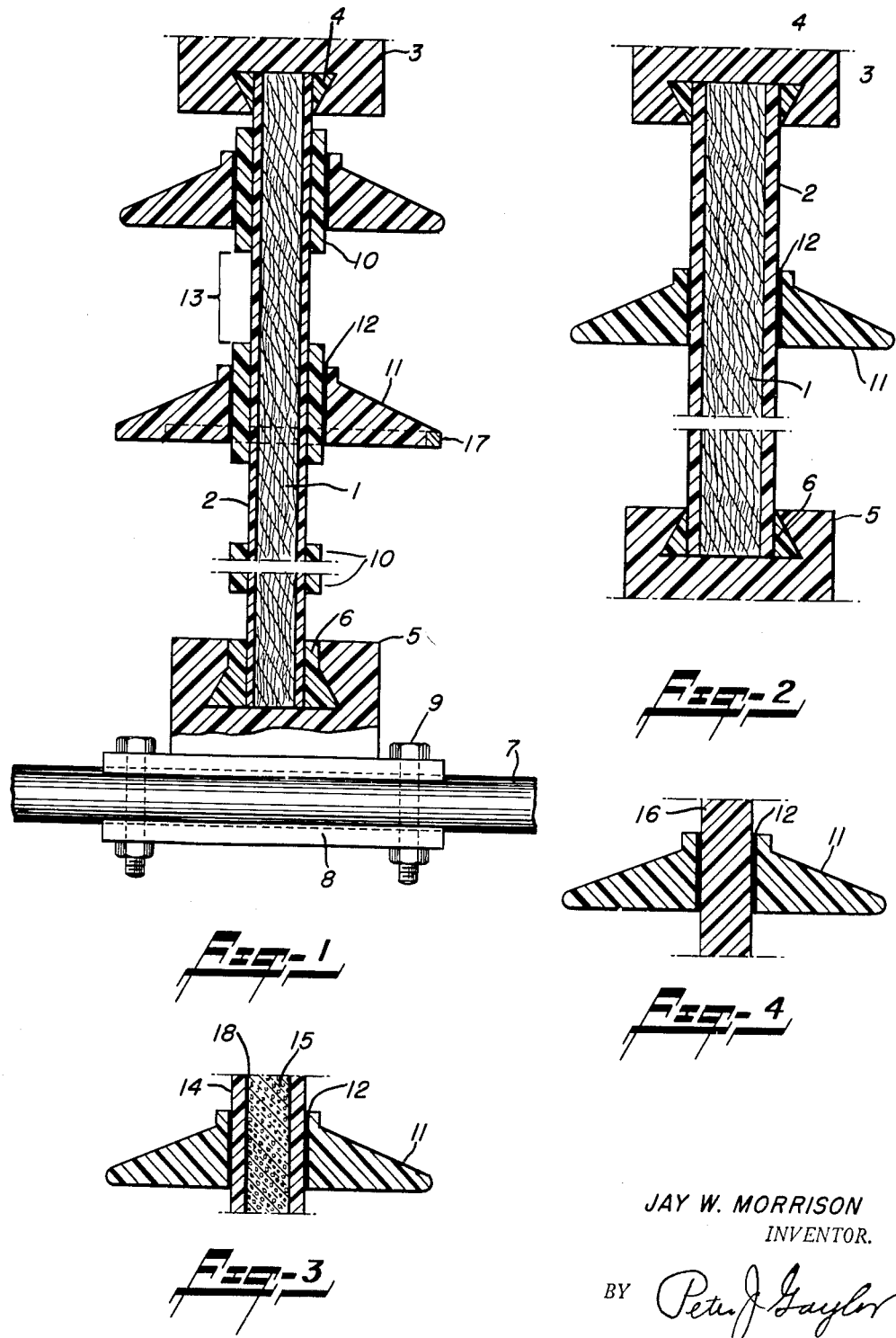

2,732,423
PLASTIC-IMPREGNATED CABLE SUSPENSION
Jay W. Morrison, Newark, N. J.

Application July 16, 1951, Serial No. 236,979

3 Claims. (Cl. 174—209)

This invention relates to cable suspension means, particularly for high tension cables. More specifically, it deals with plastic impregnated and plastic sheathed cable hangers employing a glass fiber core and spaced fiberglass-plastic disks cemented onto said hangers.

In my earlier copending application Serial No. 164,767, filed on May 27, 1950, now Patent No. 2,683,185, granted July 6, 1954, of which this application is a continuation-in-part, there was described a flexible cable suspension employing a lubricated fiberglass rope on which may be cemented disks of fiberglass-plastic laminate, giving a highly articulated flexible suspension. The present application represents an improvement over the earlier-filed application.

The present invention will be more readily understood by reference to the accompanying drawing in which Figure 1 depicts a vertical cross-sectional view of one embodiment of a preferred cable suspension. Similar views of portions of other embodiments are illustrated in Figures 2, 3 and 4. Similar numerals refer to similar parts in the various figures.

Referring again to the drawing, numeral 1 represents a glass fiber rope preferably impregnated partially or completely with a silicone rubber. A coating 2 of silicone rubber also is provided on the outer surface of rope 1, the glass fibers of which may be lubricated and may comprise, straight, braided, twisted or woven fibers, preferably of continuous filament cord. One method for accomplishing this is to coat the outer surface of the glass rope with liquid or plastic silicone compound, such as G. E. 81132 silicone resin, and to cure the silicone to the rubber stage. If desired, the center core, consisting of unimpregnated glass fibers, may be impregnated with a lubricant such as wax, silicone oil, or the like, by pumping the material into the core in the liquid state. It is preferred to employ a lubricant which possesses no excessive softening or swelling action upon the silicone rubber.

In order to minimize arcing along the surface of rope 1, it is desirable to cement to the outer surface (Figure 2) of rope 1 and preferably to coating 2, light weight insulating disks 11, preferably made of glass fiber-plastic laminate. Although a laminate is preferred for making these disks, a suitable disk may be made by impregnating randomly oriented glass fibers with a suitable resin and curing in a mold of disk-shape. These disks have a central opening into which fits tightly, impregnated rope 1 having coating 2. The disk is cemented to coating 2 at 12 by use of a material such as silicone rubber compound SE 450 (described in Technical Report CDC–180 issued by the General Electric Co.) which may be applied to the surfaces to be joined and then cured, preferably in a mold, at about 255° F. for 15 minutes.

A less satisfactory method of making the suspension is to extrude over the glass fiber rope a sheath of silicone rubber compound (such as G. E. silicone rubber compound SE–450, described in Circular CDC–180 of the General Electric Co.) and then cure the compound, preferably in a mold. In this case, some impregnation of the outer glass fibers occurs, but not to as great extent as is possible with more fluid silicone compositions. The suspension may be anchored in upper and lower supports 3 and 5 respectively by imbedding in hardenable plastic 4 and 6 respectively. The lower support 5 holding cable 7 by means of flange 8 bolted to support 5 by bolts 9, is similar to that already disclosed in my earlier-filed application hereinabove mentioned.

Another suspension means, disclosed in Figure 1, employs an impregnated glass fiber rope 1 having a silicone rubber sheath 2 to which are firmly secured and bonded, cylindrical sections 10 of hard glass-fiber-resin, preferably glass-fiber resin laminate which serve as holding means for insulating disks 11 attached and firmly bonded thereto at 12 by hardenable resin such as silicone, or similar bonding cement. Spaces 13 left between cylindrical sections 10 serve to act as articulating means and allow the suspension to flex with ease without danger of breakage of any parts thereof. Flexing also can take place within the disk mounting means which possess some flexibility.

The cylindrical sections 10 may be made of a plastic laminated tubing. Such tubing may be employed in the convolute form, made by wrapping the resin-treated glass cloth around a metal mandrel and developing equal strength in both longitudinal or circumferential directions, or in the spiral form, made by helically or spirally wrapping silicone resin-impregnated glass tape on a metal mandrel at an angle; giving a circumferential strength twice that of the longitudinal.

Another modification of a suspension, illustrated in Figure 3, comprises an impregnated glass fiber-resin laminate tube 14, the central core of which may be filled with glass-resin 15, if desired. In this case, the glass-resin may be a mass of glass fibers acting as a filler in a hardenable insulating resin, shaped in rod form and inserted into tube 14 and cemented to the inner surface 18 by means of a plastic or (silicone) rubber base cement, or the glass-resin 15 may be poured into tube 14 in the form of a potting compound which hardens on cooling, and the ends may be sealed off with a plastic or rubber cement, if desired. It is desirable to make tube 14 of silicone glass laminate, such as that described in Circular CDP–539 issued by the General Electric Company. Disks 11 are applied to the outer surface of tube 14 in the same manner as already outlined for Figures 1 and 2. It will be noted that, although the tube 14 is not as freely flexible as the more articulated suspensions of Figures 1 and 2, it is fairly flexible and is capable of withstanding the stresses and strains imposed in the swaying of the cable without collapse or damage to insulators 11, which themselves are very resistant to shock and weathering.

Another modification of the suspension means is exhibited in Figure 4. In this case, the suspension 16 comprises a solid rod of glass fiber-plastic laminate. It has been found that such rods are very flexible, are capable of supporting heavy loads, and possess considerable impact resistance. Although not as flexible as the rope-type units depicted in Figures 1–2, they do have a number of advantages in their favor, such as minimum sway, freedom from creep, etc. It is to be understood that the anchoring, fastening and holding means to cable and support with all of the suspensions depicted, could be accomplished most advantageously in the manner set out in Figure 1, or even in any conventional manner.

In order to prevent destruction of the suspension by an arc surge, as well as to induce a condenser effect in the suspension means, it is possible to provide a metal ring segment 17 around the outer periphery of one or more of the insulating disks 11. Such a ring segment may be a flat circular wire hoop segment molded into the plastic disk, or a metal hoop segment fitting into a peripheral groove in the disk edge. A complete circular hoop is not desired, since the formation of eddy currents is to be avoided.

As is apparent from the aforesaid disclosure, it is desirable to employ silicone resin wherever possible, since it has been found that silicone polymers do not form a continuous carbon track on arcing and thus possess excellent arcing resistance. Hence, for the parts depicted as 2, 3, 4, 5, 6, 12 and 15, such a resin is employed as the resin or polymer specified. In the case of the glass-fiber laminate portions 10, 11, 14 and 16, silicone-glass laminates such as those described in the General Electric Circular CDP-539 are preferred, although use could be made, in cases of less severe conditions, of glass-polyester laminates, such as the material sold as Glasweld, made by United States Plywood Corporation, and described in its Circular No. 995. As a potting compound to be used with glass fibers in element 15, one may employ a hardenable cashew shell liquid resin, such as that made by Irvington Varnish and Insulation Co. of Irvington, New Jersey.

Parts 3 and 5, although preferably made of plastic or plastic laminate, may be made of metal, such as aluminum, iron, copper, etc., and the anchoring means 4 and 6 may be of soft metal, particularly when the end portions of suspension 1 are frayed out to offer more gripping surface. In the case of tube 14 and rod 16, the ends may be provided with tapered conical locking portions to eliminate locking means 4 and 6, in which case housing 3 and 5 would be split to enable insertion of the ends of suspension 1, which split portions could then be bolted together.

Although it has been mentioned that the lubricant for the glass fibers of rope 1 may be pumped into the finished suspension, it is also possible to prelubricate the fibers during the forming of the rope or the finished rope may be soaked or impregnated with the lubricant prior to the coating or impregnation with silicone rubber 2.

I claim:

1. A highly flexible suspension for high tension cables comprising a narrow, elongated member made of glass fiber base having at least its outer portion impregnated with a rubbery insulating silicone material, and at least one glass fiber-silicone laminate disk surrounding said member and bonded directly thereto.

2. A suspension according to claim 1 in which the elongated member is coated on its outer surface with a cured silicone rubber.

3. A suspension according to claim 1 in which the disk is cemented to the coated surface of the elongated member with a silicone rubber compound.

References Cited in the file of this patent

UNITED STATES PATENTS

| 1,038,473 | Alsberg | Sept. 10, 1912 |
| 1,167,125 | Sloper | Jan. 4, 1916 |
| 2,221,582 | Hanna | Nov. 12, 1940 |

FOREIGN PATENTS

| 646,277 | Great Britain | Nov. 15, 1950 |

OTHER REFERENCES

Plastics, January 1945 edition, pgs. 40, 42, 44, and 112–115. (Copy available in 174–110.7.)